United States Patent
Miyamoto

(10) Patent No.: US 8,032,344 B2
(45) Date of Patent: Oct. 4, 2011

(54) METHOD OF SETTING PARAMETER IN METHOD OF DETECTING DECREASED PNEUMATIC PRESSURE

(75) Inventor: Kazuyoshi Miyamoto, Akashi (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/731,689

(22) Filed: Mar. 25, 2010

(65) Prior Publication Data

US 2010/0179796 A1    Jul. 15, 2010

Related U.S. Application Data

(63) Continuation of application No. PCT/JP2009/050683, filed on Jan. 19, 2009.

(30) Foreign Application Priority Data

Feb. 14, 2008   (JP) .................................. 2008-032712
Mar. 21, 2008   (JP) .................................. 2008-073544

(51) Int. Cl.
*G06G 7/48* (2006.01)
(52) U.S. Cl. ............................................... 703/8; 703/6
(58) Field of Classification Search .................. 703/6, 8; 701/29; 340/442, 443, 444
See application file for complete search history.

(56) References Cited

U.S. PATENT DOCUMENTS

| | | | |
|---|---|---|---|
| 6,060,983 A | 5/2000 | Yanase et al. | |
| 6,430,993 B1* | 8/2002 | Seta | ................. 73/146 |
| 7,308,390 B2* | 12/2007 | Shiraishi | ........................... 703/8 |
| 2002/0065617 A1 | 5/2002 | Kamiya et al. | |
| 2002/0134149 A1 | 9/2002 | Shiraishi et al. | |
| 2004/0249528 A1 | 12/2004 | Yanase | |
| 2005/0179528 A1 | 8/2005 | Kawasaki | |
| 2005/0274177 A1 | 12/2005 | Oshiro et al. | |

FOREIGN PATENT DOCUMENTS

| | | |
|---|---|---|
| JP | 4-232107 A | 8/1992 |
| JP | 11-170828 A | 6/1999 |
| JP | 2002-120528 A | 4/2002 |
| JP | 2002-160511 A | 6/2002 |
| JP | 2003-330997 A | 11/2003 |
| JP | 2005-1419 A | 1/2005 |
| JP | 2005-225428 A | 8/2005 |
| JP | 2006-1298 A | 1/2006 |

OTHER PUBLICATIONS

"CarSim Educational User Manual Version 4.5", Mechanical Simulation Corporation, Jan. 2000, 336 pages.*

* cited by examiner

*Primary Examiner* — Kamini S Shah
*Assistant Examiner* — Herng-Der Day
(74) *Attorney, Agent, or Firm* — Birch, Stewart, Kolasch & Birch, LLP

(57) ABSTRACT

A method of setting a parameter in a method of detecting a decreased tire air pressure for detecting a decreased tire air pressure based on a wheel rotational speed obtained from tires attached to a four-wheel driving vehicle. The method includes a vehicle model preparation step of preparing a vehicle model including a suspension member; a tire model preparation step of preparing a tire model; a step of inputting a friction coefficient between a tire and a road surface; and a simulation step of performing a running simulation of the vehicle model attached with the tire model. A determination parameter for determining whether the tire has a decreased air pressure or not is set based on wheel rotational speeds of the tires of the respective four wheels obtained in the simulation step.

6 Claims, 12 Drawing Sheets

(a)

(b)

METHOD OF SETTING PARAMETER IN METHOD OF DETECTING DECREASED PNEUMATIC PRESSURE

This application is a Continuation of copending PCT International Application No. PCT/JP2009/050683 filed on Jan. 19, 2009, and for which priority is claimed under 35 U.S.C. §120; and this application claims priority of Application No. 2008-032712 and 2008-073544 filed in Japan on Feb. 14, 2008 and Mar. 21, 2008, respectively, under 35 U.S.C. §119; the entire contents of all are hereby incorporated by reference into the present application.

TECHNICAL FIELD

The present invention relates to a method of setting a parameter in a method of detecting a decreased pneumatic pressure. In particular, the present invention relates to a method of setting a parameter in a method of detecting a decreased pneumatic pressure in which the parameter is set based on the motion analysis simulation of a running vehicle.

BACKGROUND ART

There has been a method of using the rotation speeds of wheels attached to a vehicle to indirectly detect whether a tire has a decreased pneumatic pressure or not (see Japanese Unexamined Patent Publication No. 2005-1419 and Japanese Unexamined Patent Publication No. 2006-1298 for example). Conventionally, the practical realization of the detection method as described above has required a process called a calibration process in which an actual vehicle test is carried out to examine the logic used for such a detection method and to optimize parameters used in the method. Specifically, a development vehicle in which a deflation warning apparatus is to be installed was obtained. Then, an actual vehicle test was carried out to run the development vehicle on a test course or the like. Through this test, there was obtained information from various kinds of sensors such as the wheel rotational speeds of the respective four wheels, a lateral G, a yaw rate, a steering angle, and a wheel torque (information required to detect a decreased pneumatic pressure). Then, the obtained test data was analyzed to thereby perform the calibration process of each vehicle. In particular, an alarm threshold value for determining whether a decreased pressure alarm is issued to a driver or not is obtained by carrying out a straight running at a fixed speed based on a plurality of speed standards to thereby calculate the threshold values based on the obtained test data.

However, since the actual vehicle test requires the development vehicle itself, the completion of the development vehicle must be waited and limitations are also caused such as the limited number of test vehicles and the limited period during which the test can be carried out. Furthermore, the test is actually carried out by a test driver. This consequently requires a large amount of costs such as a personnel cost, a vehicle maintenance cost, and a fuel cost and also causes a disadvantage in which various enormous manhours such as the ones for measurement preparation and data analysis, and a long-term development period are required. Furthermore, when a minor change is performed to a development vehicle already subjected to a calibration process, a new actual vehicle test must be performed to this development vehicle subjected to the minor change. This has required a large amount of cost and a long time for the completion of the calibration process of one type of development vehicle.

DISCLOSURE OF INVENTION

The present invention has been made in view of the above circumstances, and it is an objective of the present invention to provide a method of setting a parameter in a method of detecting a decreased pneumatic pressure by which a parameter used for the method of detecting a decreased pneumatic pressure can be selected while eliminating or reducing the test using an actual vehicle.

The method of setting a parameter in a method of detecting a decreased tire air pressure of the present invention (hereinafter also simply referred to as "setting method") is a method of setting a parameter in a method of detecting a decreased tire air pressure for detecting a decreased tire air pressure based on a wheel rotational speed obtained from tires attached to a four-wheel driving vehicle, characterized in comprising: a vehicle model preparation step of preparing a vehicle model including a suspension member; a tire model preparation step of preparing a tire model; a step of inputting a friction coefficient between a tire and a road surface; and a simulation step of performing a running simulation of the vehicle model attached with the tire model, wherein a determination parameter for determining whether the tire has a decreased air pressure or not is set based on wheel rotational speeds of the tires of the respective four wheels obtained in the simulation step, the wheel rotation speed is obtained in consideration of at least the slip between the tire and a road surface and a change of a tire radius by an application of a load, the simulation step further calculates, based on the wheel rotational speed, a parameter for determining the use of different tires for determining that tires having different characteristics are attached to the vehicle, and the accuracy of the parameter for determining the use of different tires is checked by performing the running simulation under different vehicle running conditions.

In the setting method of the present invention, the vehicle model attached with the prepared tire model is subjected to a running simulation to thereby obtain the wheel rotational speeds of the tires of the respective four wheels. Then, based on the wheel rotational speeds, a determination parameter for determining whether the tire has a decreased air pressure or not is set. Thus, a parameter required to determine a tire having a decreased pressure can be obtained without performing an actual vehicle test. This can consequently achieve a significant reduction of the cost and time that have been required for an actual vehicle test.

By performing the running simulation under different vehicle running conditions, the accuracy of the parameter for determining the use of the different tires can be increased, so that the false alarm resistant characteristic (no false alarm is issued when there is no decreased pneumatic pressure to be alarmed) of the method of detecting a tire having a decreased air pressure can be improved.

Further, the parameter for determining the use of different tires, that are used to avoid a false determination in which a tire is falsely determined to have a decreased pressure in spite of the fact that the tire actually does not have a decreased pressure can be obtained without performing an actual vehicle test.

The tire model can be prepared based on tire characteristic values including a front-and-rear force, a lateral force, an aligning moment, and a camber thrust of the tires.

The method can be configured to further include a step of inputting data representing an air resistance generated in the vehicle during the running, the data including a vehicle frontal projected area, a reference point upon which an aerodynamic force acts, an air drag coefficient, and an air lift force coefficient, and in the method the step of preparing a tire model can be a step of preparing a tire model that can at least represent characteristics of a tire front-and-rear force at a normal internal pressure and a decreased pressure, and a parameter for determining whether a driving wheel tire has a decreased air pressure or not can be set based on the wheel rotational speeds of the tires of the respective four wheels obtained in the simulation step.

The vehicle model can be prepared based on vehicle characteristic values including a vehicle gravity center, a vehicle inertia moment, a wheel base length, respective track widths of front and rear wheels of the vehicle, a vehicle weight, a spring characteristic of a suspension, a damper attenuation characteristic, and a roll center height.

DETAILED DESCRIPTION OF THE PREFERRED EMBODIMENTS

The following section will describe an embodiment of the setting method of the present invention with reference to the drawings.

A deflation warning system (DWS), which indirectly detects a tire having a decreased pressure based on the rotational angular velocity of a wheel, determines whether the tire has a decreased pressure or not by executing a program stored in advance in a storage unit included in a control means such as a control unit mounted in a vehicle. In this warning system (detection apparatus), depending on the type of the vehicle or the tire size for example, a process for determining various parameters used for the program (calibration process) is required. Parameters to be determined by the calibration process described above have been conventionally obtained by analyzing the data obtained through an actual vehicle test. In contrast with this, the present invention obtains the parameters by obtaining data through simulation to thereby analyze the data.

For example, some methods have been conventionally suggested to set an alarm threshold value (parameter) in order to issue an alarm when one wheel of the driving wheels of a two-wheel-drive vehicle has a decreased pressure or when one wheel of a four-wheel-drive vehicle has a decreased pressure. Any of these methods repeats an actual vehicle test based on a plurality of speed standards to obtain data to thereby calculate an alarm threshold value based on the obtained data.

In one embodiment of the present invention, there is used a specification by which the air resistance caused by the running of a vehicle can be calculated. The use of the specification can consider the influence from the air resistance on the running vehicle. This can consequently calculate accurately the slip amount of the driving wheels that is caused while depending on the speed. Then, by considering this slip amount and a slip amount that depends on the friction coefficient between the tires and the road surface and the tire front-and-rear force, an alarm threshold value for determining a driving wheel tire having a decreased pressure can be obtained through simulation.

There are generally two performances required for the DWS. One is an alarm performance to securely alarm a deflation to be alarmed. The other one is a false alarm resistant performance to prevent a false alarm when there is no decreased pneumatic pressure to be alarmed, i.e., when the wheel rotational speed is higher than in the case of a normal internal pressure due to the eccentric load in the vehicle or the sharp turn of the vehicle for example. In the present invention, a virtual actual vehicle test is carried out through simulation to thereby carry out a calibration process composed of the setting of the parameter and the performance check.

First Embodiment

Figure 1:
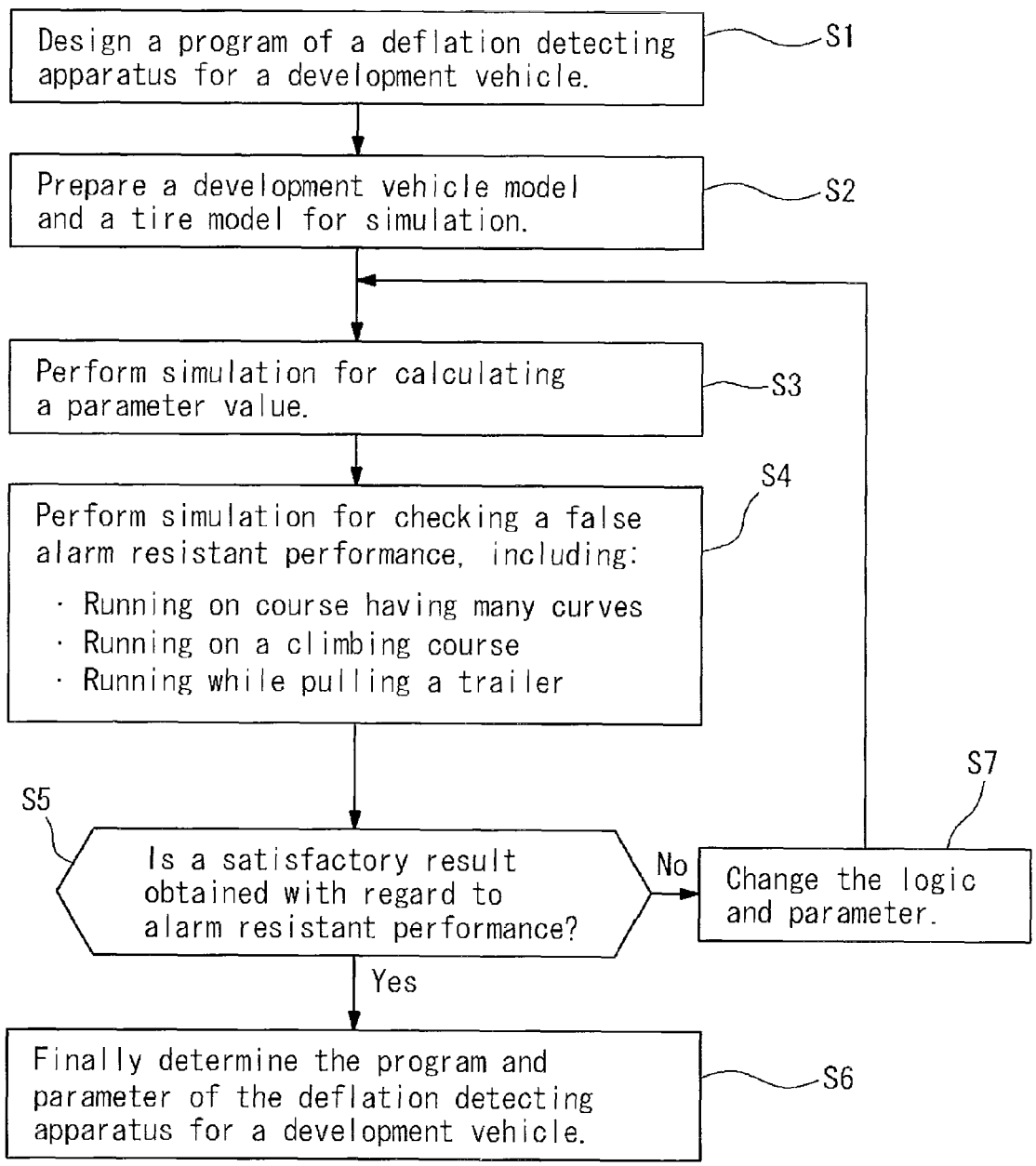
FIG. 1 is a flowchart illustrating one embodiment of a setting method of the present invention.

FIG. 1 is a flowchart illustrating the setting method according to one embodiment of the present invention (first embodiment). First, in Step S1, a program of the deflation detecting apparatus for a development vehicle is designed. The tire deflation detecting (warning) apparatus uses the principle according to which a tire having a decreased pressure has a smaller outer diameter (tire dynamic loaded radius) than that of a tire having a normal internal pressure and thus has a higher rotational angular velocity than those of other normal tires. Various determination values or determination formulae that are used to determine whether a tire has a decreased pressure or not have been conventionally suggested. For example, as determination value (DEL) for a case where a decreased pressure is detected based on the relative difference among the rotational angular velocities of tires, the following formula can be used.

$$DEL = \{(F1+F4)/2 - (F2+F3)/2\}/\{(F1+F2+F3+F4)/4\} \times 100(\%) \quad (1)$$

In the formula, F1 to F4 represent the rotational angular velocities of a left front tire, a right front tire, a left rear tire, and a right rear tire, respectively. In the deflation detecting apparatus, the resultant determination value is compared with a predetermined threshold value (e.g., DEL when a certain tire has a 30%-decreased pressure), and when the determination value exceeds this threshold value, it is estimated that the tire has a decreased pressure and an alarm is issued. In the present invention, the determination value as described above and a program for calculating the determination value as well as a threshold value for determining a decreased pressure are not particularly limited. Thus, the conventional logic and program for example can be appropriately used so long as the logic and program use the rotational angular velocities of tires of the respective four wheels to determine a tire having a decreased pressure.

Figure 3:
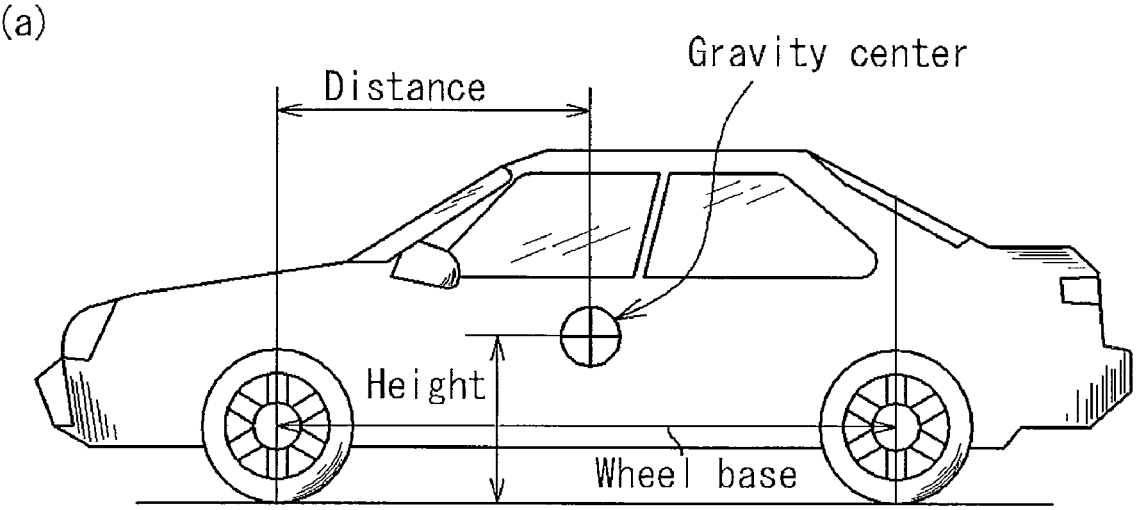
FIG. 3 illustrates input items for preparing a vehicle model.
Figure 3:
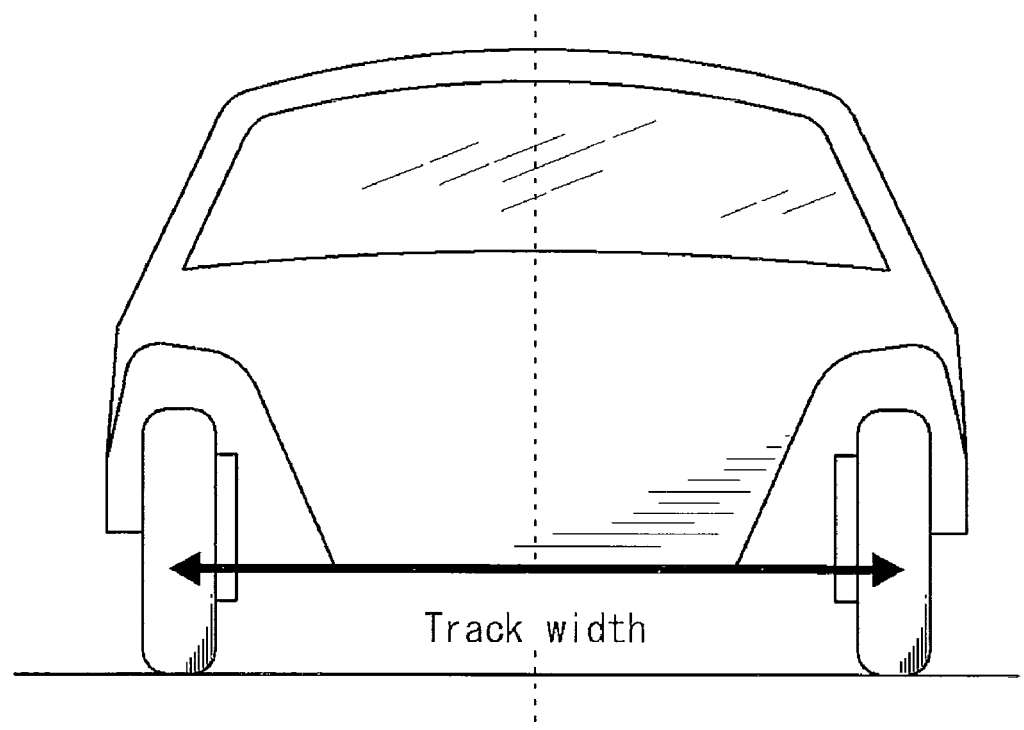
Figure 4:
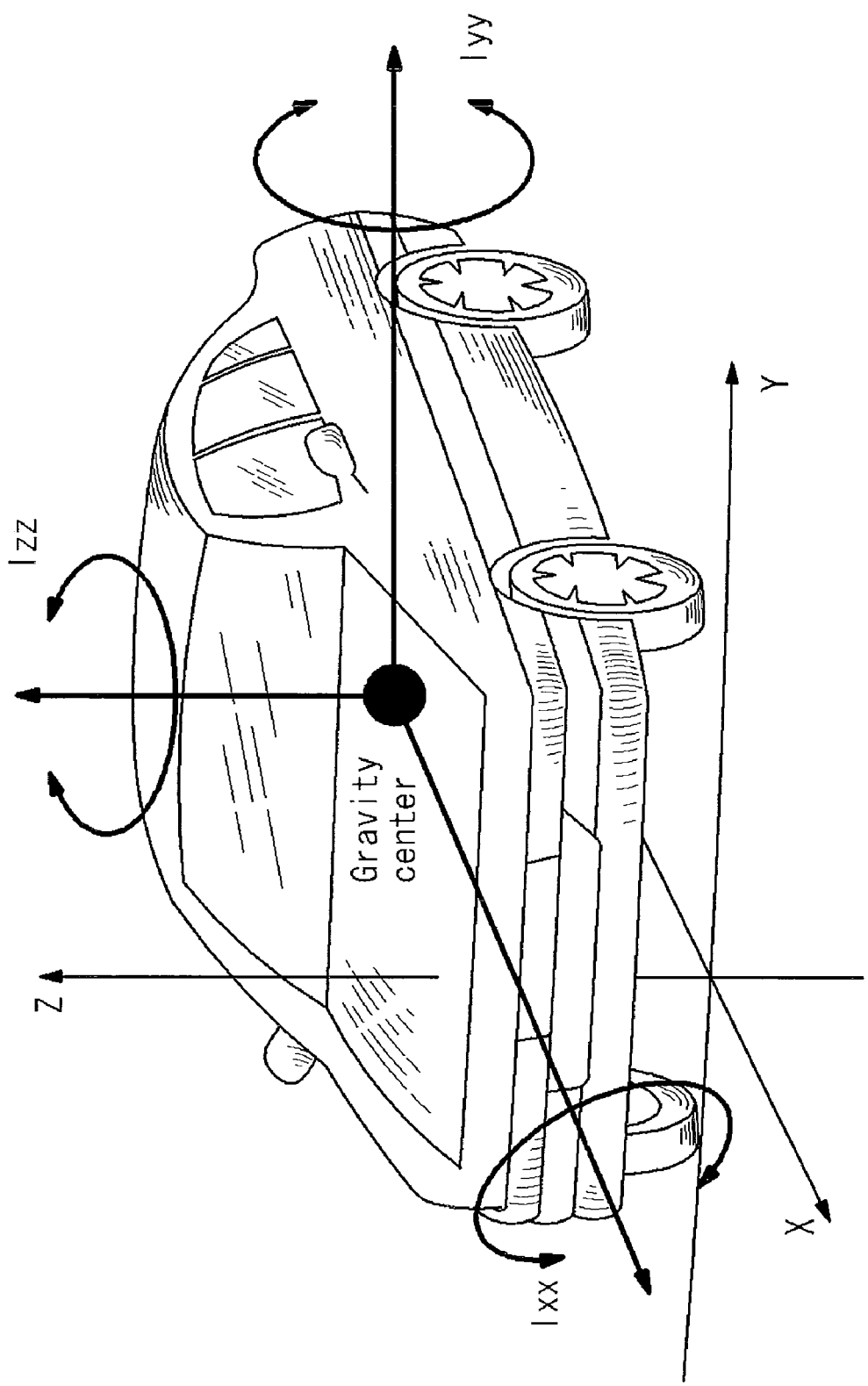
FIG. 4 illustrates input items for preparing a vehicle model.
Figure 5:
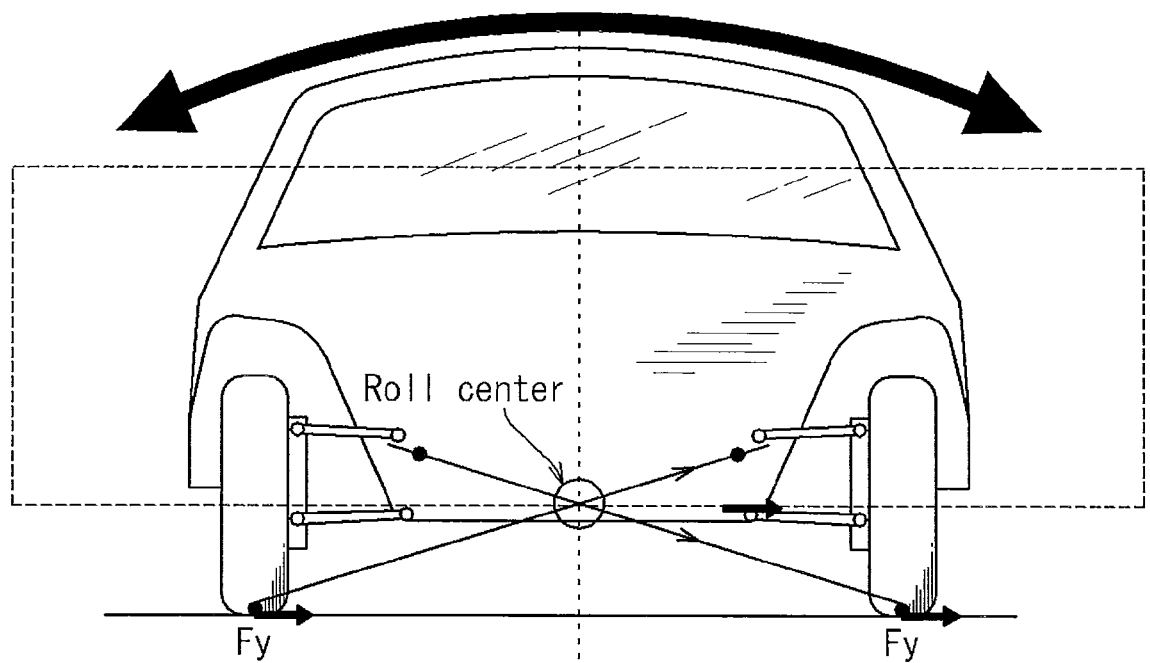
FIG. 5 illustrates input items for preparing a vehicle model.

Next, in Step S2, a development vehicle model for simulation and a tire model are prepared. In order to perform a running simulation which will be described later, a vehicle model of a development vehicle must be prepared. In an indirect deflation warning system for determining a tire having a decreased pressure based on the rotational speeds of tires attached to a four-wheel vehicle, the vehicle model can be generally prepared by inputting the vehicle characteristic values as shown in FIG. 3 to FIG. 5 including the vehicle gravity center, the vehicle inertia moment, the wheel base length, the respective track widths of the vehicle front and rear wheels, the vehicle weight (vehicle sprung weight, vehicle unsprung weight), the suspension spring characteristic, the damper attenuation characteristic, and the roll center height. However, in the case of some software to be used, the simulation also can be performed by modeling and inputting the vehicle body shape and the material property. In the case of a suspension for example, the finite element method also can be used to directly subdivide the shape of the suspension as a model, and a model having exactly the same mechanism as that of the actual suspension also can be represented. In these methods, the model is prepared based on the shapes of the individual components, i.e., shape information. When the finite element method is used and the modeling is performed based on metal material, the elastic modulus, the Poisson's ratio, and the density or the like can be used as a component material value used together with the shape information.

The values for representing the suspension dynamic characteristic through the simulation of the vehicle motion analysis include, in addition to the spring characteristic, the damper attenuation characteristic, and the roll center height of the suspension, for example, the vehicle unsprung weight, the wheel axis inertia moment including the tire wheel, and various change amounts related to the elastic characteristic of the bush section (the change amount [mm/mm] in the front-and-rear direction when the wheel axis moves in the up-and-down direction, the force [N/N] in the up-and-down direction applied to tire during braking, the change amount of the toe angle [Deg/N] when the lateral force is applied to the tire, the change amount of the steering angle [Deg/N] when the lateral force is applied to the tire, the change amount of the steering angle [Deg/N·m] when the aligning torque is applied to the tire, the change amount of the wheel center [mm/N] in the longitudinal direction when the longitudinal force is applied to the tire, the change amount of the camber angle [Deg/N] when the longitudinal force is applied to the tire, the change amount of the inclination angle [Deg/N·m] when the aligning torque is applied to the tire, the lateral change amount of the wheel center [mm/N] when the lateral force is applied to the tire, the relation between the toe angle and the upper-and-lower displacement [Deg/mm], and the relation between the camber angle and the upper-and-lower displacement [Deg/mm]). These values can be appropriately used depending on the software to be used.

Next, a tire model is prepared. This tire model can be prepared by inputting the values of tire characteristic values composed of the tire front-and-rear force (the longitudinal force [N] to the front-and-rear slip [%]), the lateral force (the cornering force, the lateral force [N] to the slip angle [Deg]), the aligning moment (SAT, the moment to the slip angle), and the camber thrust. As these characteristic values, there can be used data of a test result in a room for example. Alternatively, as in the case of the vehicle model, depending on the software to be used, the tire itself also can be modeled while having the shape including the inner structure (e.g., the modeling by the finite element method and the modeling composed of spring and the mass).

Since a tire radius changes depending on the magnitude of the load in the vertical direction applied to the tire, data or a formula that can represent the change of the radius to the applied load is inputted as representation of this characteristic. Furthermore, in this embodiment, in order to obtain a parameter for determining the use of different tires for determining that tires having different characteristics are attached, the friction coefficient between the tire and the road surface is inputted.

Next, in Step S3, simulation is performed in which a vehicle model attached with the tire model prepared in Step S2 is caused to run. Through this running simulation, the wheel rotational speeds of the respective four wheels can be obtained that consider the tire slip and a change of the tire radius due to the applied load. Then, based on the wheel rotational speeds, a parameter (determination parameter) for determining whether a tire has a decreased pressure or not can be calculated based on the above-described formula (1) for example. If there are characteristics that can be inputted by a simulation tool such as an engine torque characteristic and a torque converter characteristic, such a characteristic is preferably inputted in order to improve the simulation accuracy.

Furthermore, parameters related to the above-described false alarm resistant performance include, for example: a correction parameter for correcting a value for determining a decreased pressure (DEL) when the vehicle is turning; a parameter for determining the use of different tires for determining the status where tires having different characteristics are mixedly used in a single vehicle (e.g., only one wheel among four wheels is new and the other wheels have abrasion at a certain level); and a parameter for determining an eccentric load status for determining that a load status of a vehicle is eccentric (e.g., the vehicle load status is eccentric to the right or left side). These parameters are calculated based on the data obtained through simulation.

As a parameter related to the correction of a value for determining a decreased pressure (DEL) obtained during the vehicle turning, there is a turning correction coefficient. This turning correction coefficient is a coefficient in order to correct the departure of the value for determining a decreased pressure (DEL) caused during the vehicle turning. The correction DEL, which is the value for determining a decreased pressure (DEL) after correction, can be calculated by:

$$\text{Correction } DEL = DEL + \text{turning correction coefficient} \times \text{lateral } G \qquad (2)$$

Figure 6:
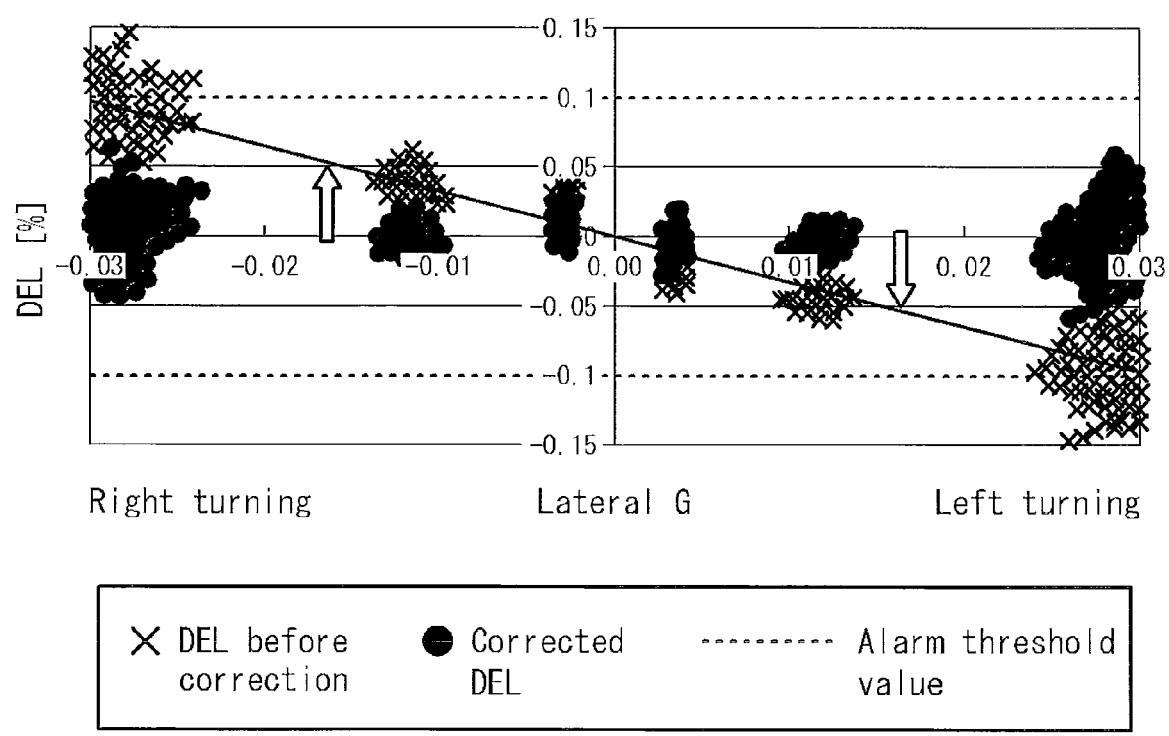
FIG. 6 illustrates the relation between parameters for determining a decreased pressure and the lateral G.

FIG. 6 illustrates the departure of DEL due to the turning and the correction thereof. In FIG. 6, the horizontal axis shows the lateral G and the vertical axis shows the DEL. The turning running simulation is performed, the value for determining a decreased pressure (DEL) when some lateral Gs are caused is calculated based on the wheel rotational speeds of the respective four wheels, and the turning correction coefficient can be calculated based on the relation between the lateral G and the value for determining a decreased pressure (DEL). When no correction is performed, an increase of the turning level to a certain level causes the DEL to exceed an alarm threshold value even when the tires do not have a decreased pressure. However, a false alarm can be avoided by increasing the correction amount of the DEL in proportion with the lateral G.

The parameter for determining the use of different tires can be calculated in the manner as described below for example. In the case where only one wheel among the four wheels is new and the other wheels are abraded tires, the data showing the tire characteristic of a new wheel is inputted with regard to the one wheel and the data showing the tire characteristic of the abraded status is inputted with regard to the other three wheels. Then, the running simulation is performed based on the tire data, and based on the resultant wheel rotation speeds of the respective four wheels, a parameter for judging the use of different tires can be calculated. Specifically, the parameter for judging the use of different tires can be calculated by the fact that the frictional force to the torque between the tires and the road surface is different depending on the level of the tire abrasion. Thus, the use of different tires can be determined if the rotational ratio between the left and right wheels of driving wheels changes to the torque applied to the wheel axis or the speed.

Alternatively, whether different tires are used or not also can be determined by comparing the three factors of the DEL obtained through the above-described formula (1), the DEL based on the rotational speed ratio between the front wheel and the rear wheel, and the DEL based on the rotational speed ratio between the left wheel and the right wheel.

When the vehicle load status is eccentric to the right side, the parameter for determining an eccentric load status can be calculated, for example, by applying a load to the vehicle data in accordance with an assumed load status to perform the running simulation to subsequently calculate the parameter based on the resultant wheel rotational speeds of the respective four wheels. Specifically, whether an eccentric load is caused or not can be determined by comparing the three factors of the DEL obtained by the above-described formula (I), the DEL based on the rotational speed ratio between the front wheel and the rear wheel, and the DEL based on the rotational speed ratio between the left wheel and the right wheel.

As simulation software by which a vehicle motion analysis can be performed, there can be appropriately used simulation software frequently used in the automotive industry including, for example, "Adams" (product name), "veDYNA" (product name), "CarSim" (product name), and "LS-DYNA" (product name). The present invention is not limited to any particular software so long as the software can provide a vehicle motion analysis.

Next, in Step S4, simulation for checking the false alarm resistant performance is performed. In Step S3, various parameters for avoiding a false alarm (a correction parameter, a parameter for determining the use of different tires, and a parameter for determining an eccentric load status) are calculated. Then, the accuracies of the parameters are checked by variously changing the vehicle running conditions.

With regard to the correction parameter, whether the set correction parameter can avoid a false alarm or not can be checked by causing the vehicle to run on a course having many curves.

A false alarm during the use of different tires tends to be caused when the vehicle driving force is significantly transmitted to the ground, and one example thereof is the case where a trailer is pulled. A false alarm tends to be caused if different tires are used in such a situation. The same applies to the case where the vehicle is running on a mountain road. Since the driving force must be significantly transmitted to the ground in order to allow the vehicle to climb such a road, a false alarm may be caused in the case where different tires are used because the tires have different frictional forces to the road surface. Thus, by simulating the running on the climbing course and the running while pulling a trailer, the accuracy of the parameter for determining the use of different tires can be checked.

Then, in Step S5, it is determined whether or not a predetermined accuracy regarding the false alarm resistant performance (e.g., a predetermined accuracy that avoids a false alarm under the predetermined running conditions that the vehicle would experience) was obtained through the simulation with different running conditions. When the predetermined accuracy is obtained, the processing proceeds to Step S6 to determine the program and various parameters of the deflation detecting apparatus for a development vehicle. When the predetermined accuracy is not obtained on the other hand, the logic and/or parameter for determining a decreased pressure is changed in Step S7 and the processing returns to Step S3.

In the deflation warning system according to the present invention, a decreased pressure alarm can be prevented from being issued in order to avoid a false alarm when the use of different tires or an eccentric load is determined. Alternatively, a change in the rotational speed of the wheels due to the use of different tires and an eccentric load also can be taken in consideration to set a slightly-high threshold value for issuing an alarm for a decreased pressure so that an alarm can be issued only when the amount of a decreased pressure is high.

Second Embodiment

Figure 2:
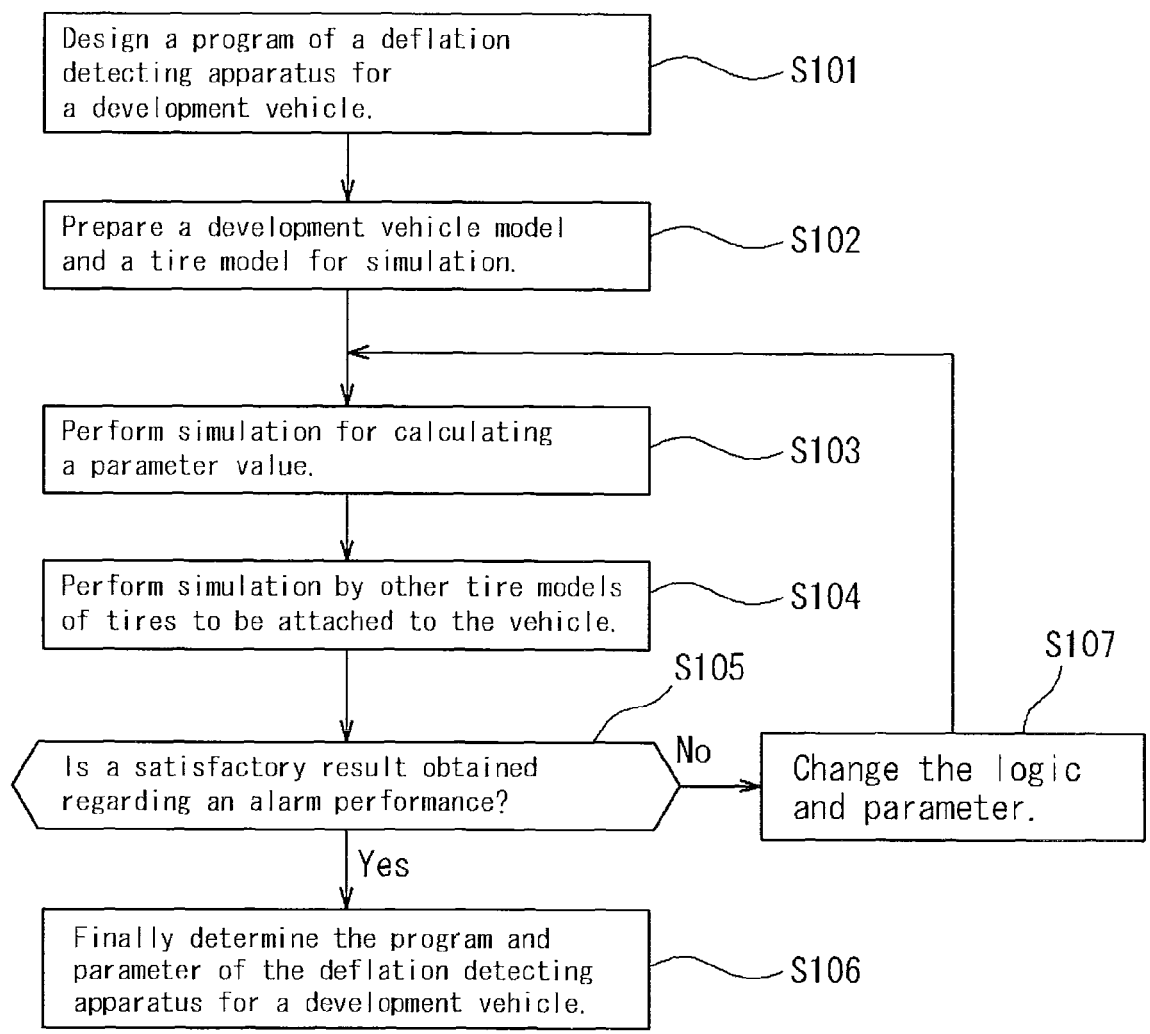
FIG. 2 is a flowchart illustrating another embodiment of a setting method of the present invention.

FIG. 2 is a flowchart illustrating the setting method according to another embodiment of the present invention (the second embodiment).

First, in Step S101, a program of the deflation detecting apparatus for a development vehicle is designed. The details of Step S101 are the same as those of Step S1 in the first embodiment.

In this embodiment, whether or not one wheel of the driving wheels of a two-wheel-drive vehicle or one wheel of a four-wheel-drive vehicle has a decreased pressure is detected. The determination value (DEL) can be the formula (1) for example.

In this embodiment, by considering the air resistance as described above, the slip amount of a driving wheel caused depending on the speed is calculated. Then, by considering this slip amount and a slip amount that depends on the friction coefficient between the tires and the road surface and the tire front-and-rear force, a change in the tire rotational speed due to a decreased pressure can be calculated accurately.

Next, in Step S102, a development vehicle model and a tire model for simulation are prepared. The details of the preparation of the development vehicle model and the tire model in Step S102 are almost the same as those of Step S2 in the first embodiment except for that the tire model in Step S102 is prepared by inputting tire characteristic values such as the tire front-and-rear forces at a normal internal pressure and a decreased pressure.

In Step S102, the friction coefficient between the tires and the road surface is inputted. In addition, data is also inputted including a vehicle frontal projected area, a reference point upon which the aerodynamic force acts (a point upon which the aerodynamic force can act in a model of a spring-mass point system for the simulation of the aerodynamic force acting on the entirety of an actual vehicle body), an air drag coefficient, and an air lift force coefficient that represent the air resistance caused in the vehicle during the running. By these pieces of data or the specification, an air resistance generated in the vehicle during the running can be calculated.

By considering this air resistance, the slip amount of a driving wheel caused depending on the speed can be calculated accurately.

Next, in Step S103, simulation is performed in which the vehicle model attached with the tire model prepared in Step S102 is caused to run. This running simulation can provide the wheel rotational speeds of the respective four wheels considering the tire slip. Then, based on the wheel rotational speeds, a parameter for determining whether a tire has a decreased pressure or not (determination value) can be calculated by the above-described formula (1) for example. If there are characteristics that can be inputted by a simulation tool such as an engine torque characteristic and a torque converter characteristic, such a characteristic is preferably inputted in order to improve the simulation accuracy.

Next, in Step S104, the simulation is performed with other models of tires to be attached to the vehicle. Generally, there are a plurality of types of tires to be attached to one vehicle type (development vehicle). Thus, even when one type of tire is analyzed from among the plurality of types of tires and parameter suitable for the tire type is set, it is unclear whether or not the parameter is suitable for other tires to be attached to the vehicle. Therefore, it is preferable that other types of tires (other tires to be attached to the vehicle) are simulated to determine whether the already-obtained parameter is appropriate or not and whether the parameter must be changed or not. Criteria may be that an alarm is securely issued when the tire actually has a decreased pressure and a false alarm can be prevented. With regard to FIG. 9 or table 14 shown later, criteria may be whether or not a 25%-decreased pressure of driving wheel in the speed range of 30 to 140 kph in a rated load status (the maximum load status) can be alarmed and whether or not an alarm is prevented at a light decreased pressure amount such as a 10%-decreased pressure in a light load status (a status corresponding to two occupants).

Then, in Step S105, whether or not a satisfactory result is obtained for the alarm performance is determined. When a satisfactory result is obtained (Yes), the processing proceeds to Step S106 to determine a program and various parameters of the deflation detecting apparatus for a development vehicle. When a satisfactory result is not obtained (No) on the other hand, the logic and/or parameter for determining a decreased pressure is changed in Step S107 and the processing returns to Step S103.

The following section will describe examples of the present invention. However, the present invention is not limited to the examples only.

Example 1

Figure 7:
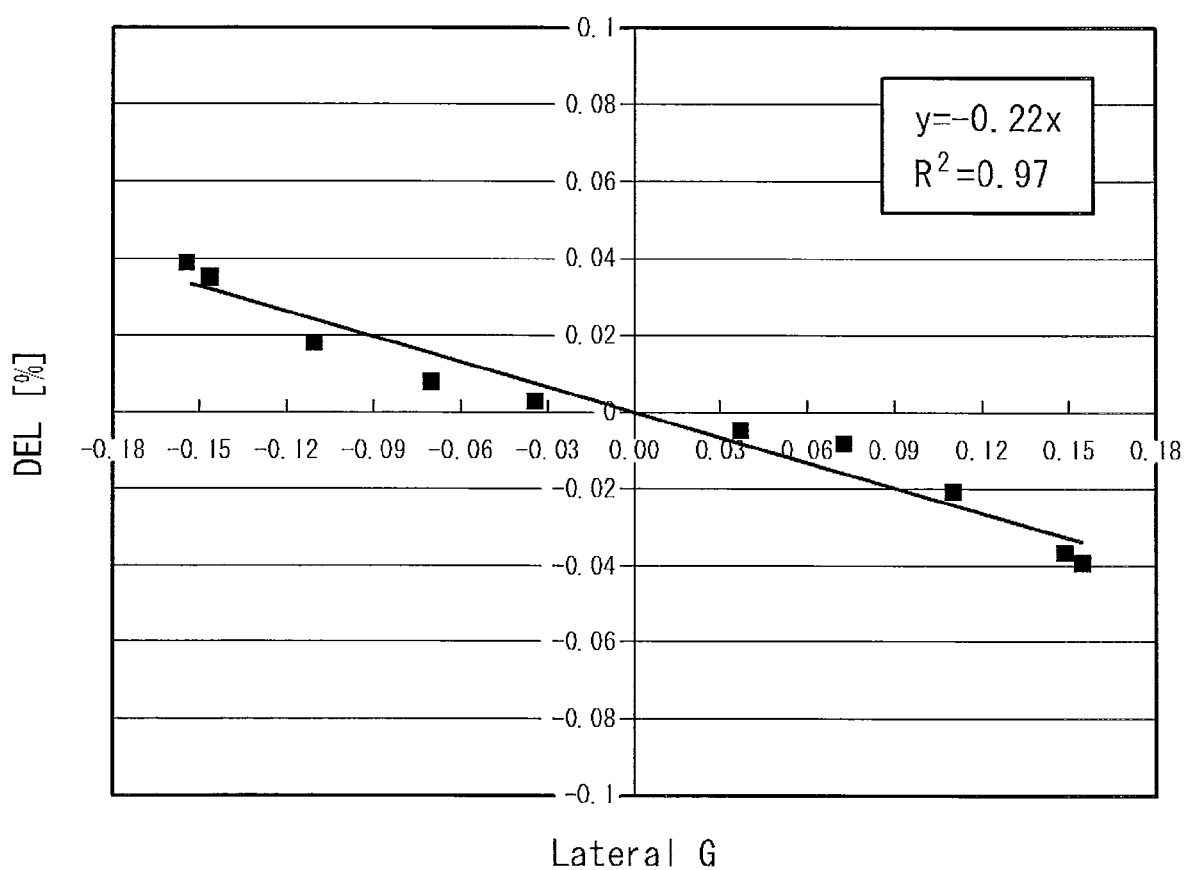
FIG. 7 illustrates the relation by simulation between parameters for determining a decreased pressure and the lateral G.

As vehicle motion analysis simulation software, CarSim® (vehicle motion simulation software of Virtual Mechanics Corporation) was used. As vehicle data required for a test vehicle A, the vehicle data shown in Table 1 to Table 3 was inputted (see FIGS. 3 to 5 regarding data items). Furthermore, tire data shown in Table 4 to Table 6 was inputted as tire data. Next, a running simulation was performed to perform a simulation for calculating a correction parameter for avoiding a false alarm during the turning (turning correction coefficient). The result of the simulation is shown in FIG. 7.

TABLE 1

| | Gravity center position [mm] | | Sprung weight Mass [kg] | Wheel base [mm] | Track width [mm] | |
|---|---|---|---|---|---|---|
| | Distance | Height | | | Front wheel | Rear wheel |
| Vehicle A | 1500 | 600 | 1900 | 3000 | 1550 | 1550 |

TABLE 2

| | Ixx [kg · m$^2$] | Iyy [kg · m$^2$] | Izz [kg · m$^2$] |
|---|---|---|---|
| Vehicle A | 800 | 4200 | 4400 |

TABLE 3

| | Spring characteristic [N/mm] | | Attenuation characteristic [N · sec/mm] | | Roll center height [mm] | | Unsprung weight [kg] | |
|---|---|---|---|---|---|---|---|---|
| | Front wheel | Rear wheel | Front wheel | Rear wheel | Front wheel | Rear wheel | Front wheel | Rear wheel |
| Vehicle A | 25 | 30 | 1.7 | 1.8 | 100 | 80 | 90 | 90 |

TABLE 4

Tire front-and-rear force

| | Slip ratio [%] | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 20 | 30 | 40 | 50 | 60 | 70 | 75 |
| Front-and-rear force [N] at longitudinal load of 3000 N | 0 | 82 | 249 | 406 | 507 | 582 | 628 | 650 | 663 | 670 | 675 | 681 | 679 | 650 | 589 | 549 | 503 | 472 |
| Front-and-rear force [N] at longitudinal load of 5500 N | 0 | 151 | 457 | 745 | 929 | 1068 | 1150 | 1191 | 1216 | 1229 | 1237 | 1249 | 1245 | 1192 | 1080 | 1006 | 922 | 866 |
| Front-and-rear force [N] at longitudinal load of 8000 N | 0 | 219 | 664 | 1084 | 1351 | 1553 | 1673 | 1733 | 1769 | 1788 | 1799 | 1816 | 1811 | 1734 | 1570 | 1463 | 1341 | 1259 |

TABLE 5

| | Lateral force (cornering force) | | | | | | | | | | | | |
|---|---|---|---|---|---|---|---|---|---|---|---|---|---|
| | Slip angle [deg.] | | | | | | | | | | | | |
| | 0 | 1 | 2 | 3 | 4 | 5 | 6 | 7 | 8 | 9 | 10 | 11 | 12 |
| Lateral force [N] at longitudinal load of 3000 N | 0 | 786 | 1658 | 2289 | 2584 | 2820 | 2911 | 2970 | 2970 | 2900 | 2973 | 2902 | 2848 |
| Lateral force [N] at longitudinal load of 5500 N | 0 | 1136 | 2533 | 3605 | 4288 | 4576 | 4846 | 4959 | 4959 | 4968 | 4979 | 4940 | 4913 |
| Lateral force [N] at longitudinal load of 8000 N | 0 | 1186 | 2819 | 4262 | 5244 | 5769 | 6235 | 6480 | 6460 | 6592 | 6497 | 6485 | 6524 |

TABLE 6

| | Aligning moment | | | | | | | | |
|---|---|---|---|---|---|---|---|---|---|
| | Slip angle [deg.] | | | | | | | | |
| | 0 | 1 | 2 | 3 | 4 | 5 | 6 | 7 | 8 |
| Aligning moment [N · m] at longitudinal load of 3000 N | 0 | 15 | 24 | 25 | 21 | 12 | 10 | 6 | 1 |
| Aligning moment [N · m] at longitudinal load of 5500 N | 0 | 38 | 62 | 75 | 66 | 49 | 41 | 27 | 13 |
| Aligning moment [N · m] at longitudinal load of 8000 N | 0 | 57 | 108 | 130 | 129 | 103 | 87 | 66 | 42 |

Camber thrust Stiffness [N/deg.] = −60 (constant)

Comparative Example 1

Figure 8:
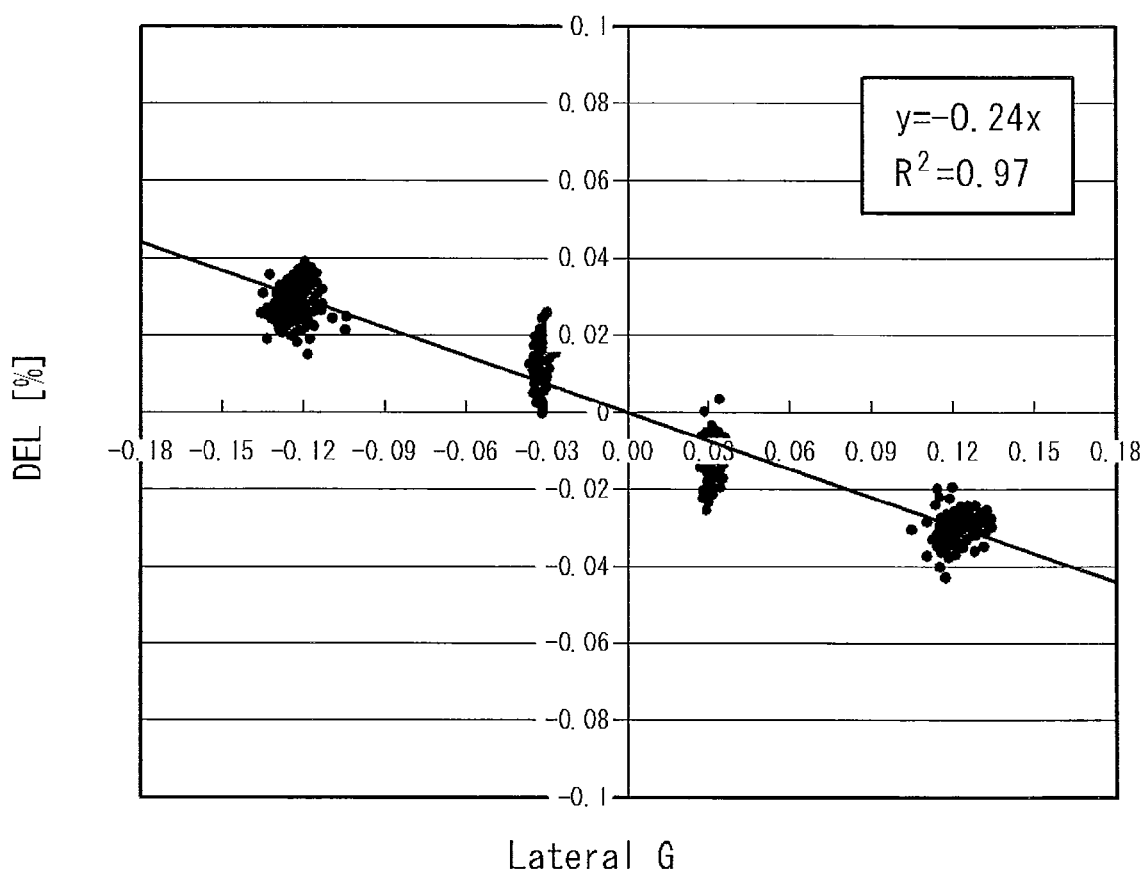
FIG. 8 illustrates the relation by an actual vehicle test between parameters for determining a decreased pressure and the lateral G.

An actual vehicle Lest was performed where lateral G at some levels was given to the test vehicle A and the turning correction coefficient was calculated. The result of the actual vehicle test is shown in FIG. 8.

The actual vehicle test showed a result of a turning correction coefficient=0.24. On the other hand, simulation showed a result of a turning correction coefficient=0.22. A ratio of the turning correction coefficient obtained through the simulation to the turning correction coefficient obtained through the actual vehicle test is 91.7(%). This shows that the turning correction coefficient can be set by simulation within an accuracy range of 10%.

Example 2

As vehicle motion analysis simulation software, CarSim® (vehicle motion simulation software of Virtual Mechanics Corporation) was used. As vehicle data required for a test vehicle B (front-wheel driving or rear-wheel driving or four-wheel driving), the vehicle data shown in Table 7 to Table 9 was inputted (see FIGS. 3 to 5 regarding the data items). Furthermore, the tires C were 225/50R17 (made by DUNLOP) and the tire data shown in Table 10 to Table 13 was inputted as tire data. Furthermore, the following data was inputted as a specification regarding an air resistance.

Data for Calculating Air Resistance

Frontal projected area: 1.8 m²

Aerodynamic drag coefficient: 0.34

Aerodynamic lift force coefficient: 0.16

Reference point upon which aerodynamic force acts: 1.44 m-rear side from the front wheel axis center, the vehicle width center and 0 m-height to the ground Next, the running simulation was performed to perform simulation to calculate an alarm threshold value as a parameter regarding an alarm performance. The result of the simulation is shown in Table 14 and FIG. 9

TABLE 7

| | Gravity center position [mm] | | Sprung weight Mass [kg] | Wheel base [mm] | Track width [mm] | |
|---|---|---|---|---|---|---|
| | Distance | Height | | | Front wheel | Rear wheel |
| Vehicle A | 1500 | 600 | 1900 | 3000 | 1550 | 1550 |

TABLE 8

| | Ixx [kg · m²] | Iyy [kg · m²] | Izz [kg · m²] |
|---|---|---|---|
| Vehicle A | 800 | 4200 | 4400 |

TABLE 9

| | Spring characteristic [N/mm] | | Attenuation characteristic [N · sec/mm] | | Roll center height [mm] | | Unsprung weight [kg] | |
|---|---|---|---|---|---|---|---|---|
| | Front wheel | Rear wheel | Front wheel | Rear wheel | Front wheel | Rear wheel | Front wheel | Rear wheel |
| Vehicle A | 35 | 40 | 1450 | 1550 | 100 | 80 | 90 | 90 |

TABLE 10

Tire front-and-rear force (normal internal pressure)

| | Slip ratio [%] | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 20 | 30 | 40 | 50 | 60 | 70 | 75 |
| Front-and-rear force [N] at longitudinal load of 3000 N | 0 | 82 | 249 | 406 | 507 | 582 | 628 | 650 | 663 | 670 | 675 | 681 | 679 | 650 | 589 | 549 | 503 | 472 |
| Front-and-rear force [N] at longitudinal load of 5500 N | 0 | 151 | 457 | 745 | 929 | 1068 | 1150 | 1191 | 1216 | 1229 | 1237 | 1249 | 1245 | 1192 | 1080 | 1006 | 922 | 866 |
| Front-and-rear force [N] at longitudinal load of 8000 N | 0 | 219 | 664 | 1084 | 1351 | 1553 | 1673 | 1733 | 1769 | 1788 | 1799 | 1816 | 1811 | 1734 | 1570 | 1463 | 1341 | 1259 |

TABLE 11

Tire front-and-rear force (at 25%-decreased pressure)

| | Slip ratio [%] | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 20 | 30 | 40 | 50 | 60 | 70 | 75 |
| Front-and-rear force [N] at longitudinal load of 3000 N | 0 | 82 | 249 | 406 | 507 | 582 | 628 | 650 | 663 | 670 | 675 | 681 | 679 | 650 | 589 | 549 | 503 | 472 |
| Front-and-rear force [N] at longitudinal load of 5500 N | 0 | 151 | 457 | 745 | 929 | 1068 | 1150 | 1191 | 1216 | 1229 | 1237 | 1249 | 1245 | 1192 | 1080 | 1006 | 922 | 866 |
| Front-and-rear force [N] at longitudinal load of 8000 N | 0 | 219 | 664 | 1084 | 1351 | 1553 | 1673 | 1733 | 1769 | 1788 | 1799 | 1816 | 1811 | 1734 | 1570 | 1463 | 1341 | 1259 |

TABLE 12

Lateral force (cornering force)

| | Slip angle [deg.] | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| Lateral force [N] at longitudinal load of 3000 N | 0 | 786 | 1658 | 2289 | 2584 | 2820 | 2911 | 2970 | 2970 | 2900 | 2973 | 2902 | 2848 |
| Lateral force [N] at longitudinal load of 5500 N | 0 | 1136 | 2533 | 3605 | 4288 | 4576 | 4846 | 4959 | 4959 | 4968 | 4979 | 4940 | 4913 |
| Lateral force [N] at longitudinal load of 8000 N | 0 | 1186 | 2819 | 4262 | 5244 | 5769 | 6235 | 6480 | 6460 | 6592 | 6497 | 6485 | 6524 |

TABLE 13

Aligning moment

| | Slip angle [deg.] | | | | | | | | |
|---|---|---|---|---|---|---|---|---|---|
| | 0 | 1 | 2 | 3 | 4 | 5 | 6 | 7 | 8 |
| Aligning moment [N · m] at longitudinal load of 3000 N | 0 | 15 | 24 | 25 | 21 | 12 | 10 | 6 | 1 |
| Aligning moment [N · m] at longitudinal load of 5500 N | 0 | 38 | 62 | 75 | 66 | 49 | 41 | 27 | 13 |

TABLE 13-continued

| | Aligning moment | | | | | | | | |
|---|---|---|---|---|---|---|---|---|---|
| | Slip angle [deg.] | | | | | | | | |
| | 0 | 1 | 2 | 3 | 4 | 5 | 6 | 7 | 8 |
| Aligning moment [N · m] at longitudinal load of 8000 N | 0 | 57 | 108 | 130 | 129 | 103 | 87 | 66 | 42 |

Camber thrust Stiffness [N/deg.] = −60 (constant)

TABLE 14

| Speed [kph] | Light load, driven wheel - 10% DEL | Rated load, driving wheel - 25% actual vehicle test DEL | Rated load, driving wheel - 25% calculation DEL | Difference between calculation result and actual test result |
|---|---|---|---|---|
| 30 | 0.065 | 0.111 | 0.110 | −1.2% |
| 60 | 0.065 | 0.105 | 0.109 | 3.6% |
| 90 | 0.065 | 0.105 | 0.102 | −3.4% |
| 120 | 0.064 | 0.098 | 0.090 | −8.3% |
| 140 | 0.063 | 0.083 | 0.079 | −5.3% |

Comparative Example 2

Figure 9:
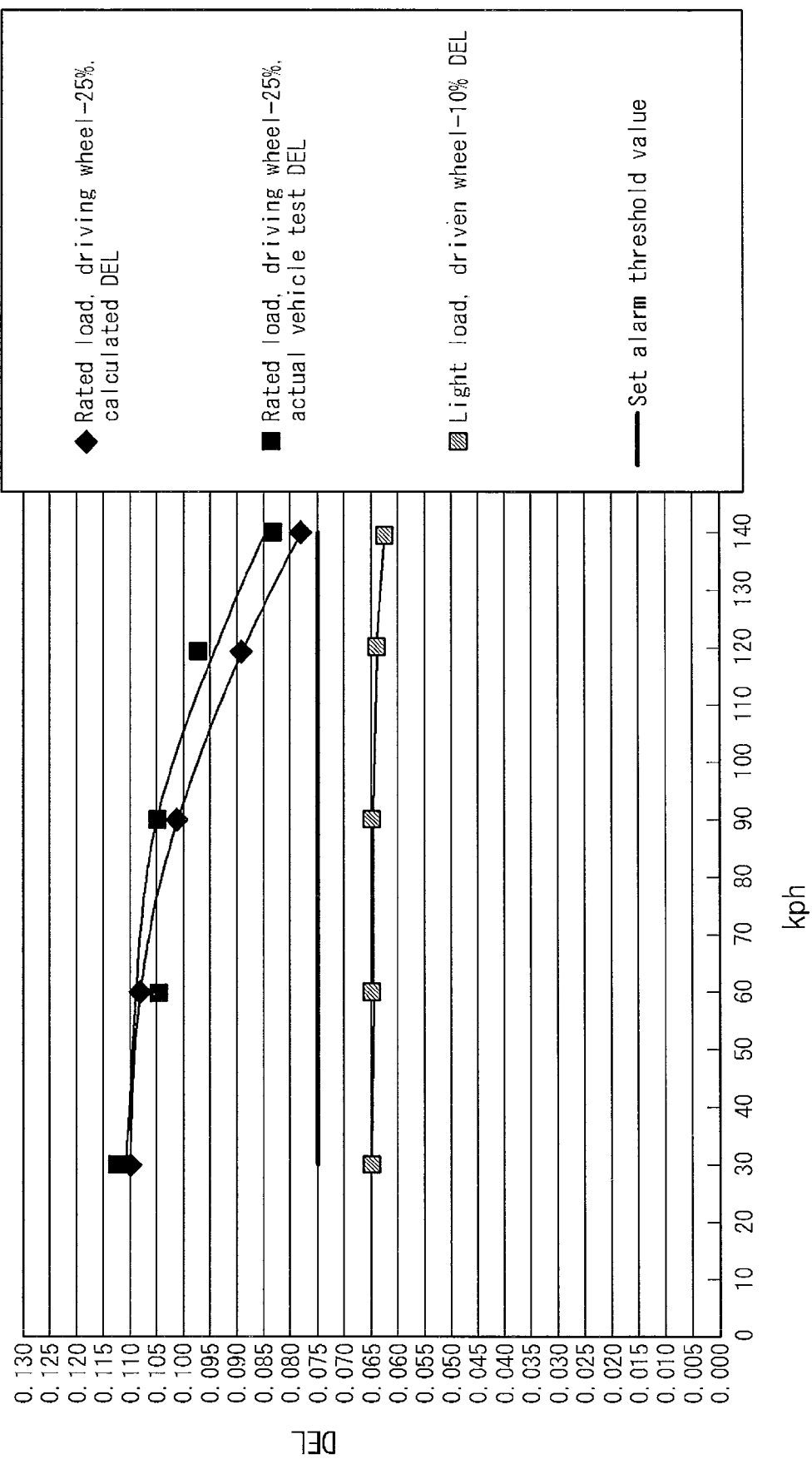
FIG. 9 illustrates the relation by the simulation and the actual vehicle test between a value for determining a decreased pressure DEL and a vehicle speed.

The test vehicle B was subjected to an actual vehicle test to calculate a value for determining a decreased pressure (DEL) when one driving wheel has a decreased pressure. The result of the actual vehicle test is shown in FIG. 9.

As can be seen, the value for determining a decreased pressure obtained through the simulation is calculated within an accuracy range of 10% to the value for determining a decreased pressure obtained through the actual vehicle test. Thus, an alarm threshold value, which is one of parameters in the method of detecting a decreased pneumatic pressure, can be accurately set. By performing the vehicle motion analysis simulation, the alarm threshold value could be calculated without performing an actual vehicle test, thus reducing the cost and manhours required for the actual vehicle test.

As described above, the current situation is that an actual vehicle test is performed to acquire parameters required for the deflation detecting apparatus. However, there are frequently a plurality of original equipment (OE) tires to be attached to the vehicle at the purchase. A parameter required for the deflation detecting apparatus may be different depending on tires attached to the vehicle. Such parameters include, for example, an alarm threshold value and a turning correction coefficient for correcting the value for determining a decreased pressure during the vehicle turning. To cope with this, the current situation is that such values are determined as parameter values that allow all of a plurality of OE tires to satisfy the performances admitted by automakers.

This causes, when there are a plurality of OE tires, a case where a parameter value optimal for tires actually attached to the vehicle is not selected. Furthermore, the alarm performance when a replacement tire is attached to the vehicle is unknown.

As a method of using optimal parameter values for the individual OE tires, there may be considered to acquire in advance optimal values for the individual OE tires through an actual vehicle test and to imput the resultant optimal values to the deflation warning system (DWS) to be mounted in the vehicle because the number of the OE tires is limited. However, since there are an unlimited number of replacement tires, it is unrealistic to perform an actual vehicle test in advance in order to obtain these optimal values.

In view of this, an approach may be considered to perform the above-described calibration process by simulation including the setting of an alarm threshold value not at the development stage but at the stage at which tires are attached to the vehicle after the sales of the vehicle. Specifically, the above-described setting method performs simulation by a calculator (computer) at the development site. This calibration process by simulation can be performed by an in-vehicle computer, a site or a server for calculating an optimal value that can be accessed via an information communication infrastructure such as the Internet, or a personal computer owned by a manufacturer or an individual person. Then, the optimal values of the individual tires obtained as an output can be inputted as parameter values to the DWS mounted in the vehicle, thereby realizing an accurate detection of a decreased pneumatic pressure even in the case of a replacement tire.

The following three embodiments may be considered as an embodiment for realizing the calibration process by simulation as described above.

Embodiment A

In this embodiment, the simulation is performed by a computer mounted in a vehicle.

Figure 10:
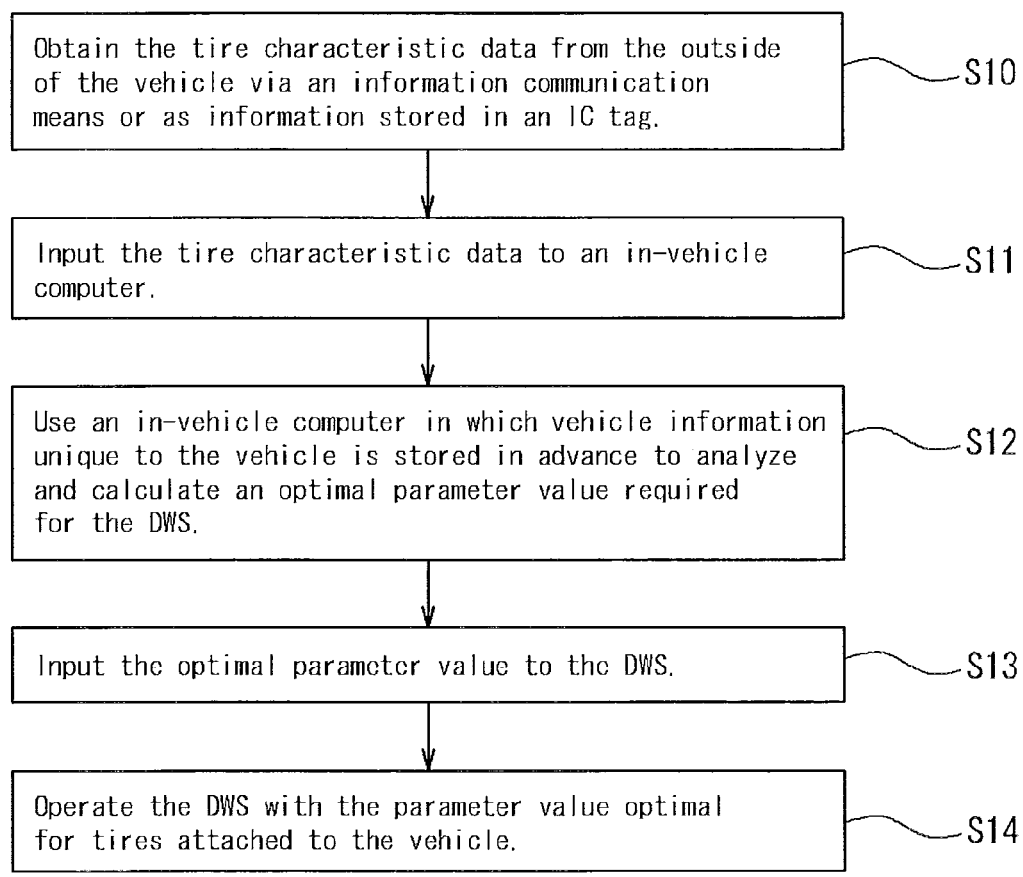
FIG. 10 is a flowchart illustrating one example of the method of setting a parameter in the method of detecting a decreased tire pneumatic pressure.

First, vehicle information such as the vehicle gravity center and the vehicle inertia moment is inputted in advance to the computer mounted in the vehicle. As shown in FIG. 10, tire characteristic data (e.g., tire front-and-rear force, aligning moment) is acquired from the outside of the vehicle via an information communication means such as the Internet or as information included in an IC tag (Step S10).

Next, in Step S11, the acquired tire characteristic data is inputted to an in-vehicle computer. Next, in Step S12, the in-vehicle computer in which vehicle information unique to the vehicle is stored in advance is used to perform the simulation to acquire the parameters required for the DWS (e.g., an alarm threshold value, a turning correction coefficient for correcting an alarm determination value during the turning, a parameter for determining an eccentric load status, and a threshold value for setting the data rejecting conditions).

Next, when the optimal parameter values obtained in Step S12 are inputted to the in-vehicle DWS in Step S13, the DWS can be operated based on parameter values optimal for the tires attached to the vehicle (Step S14).

Embodiment B

Figure 11:
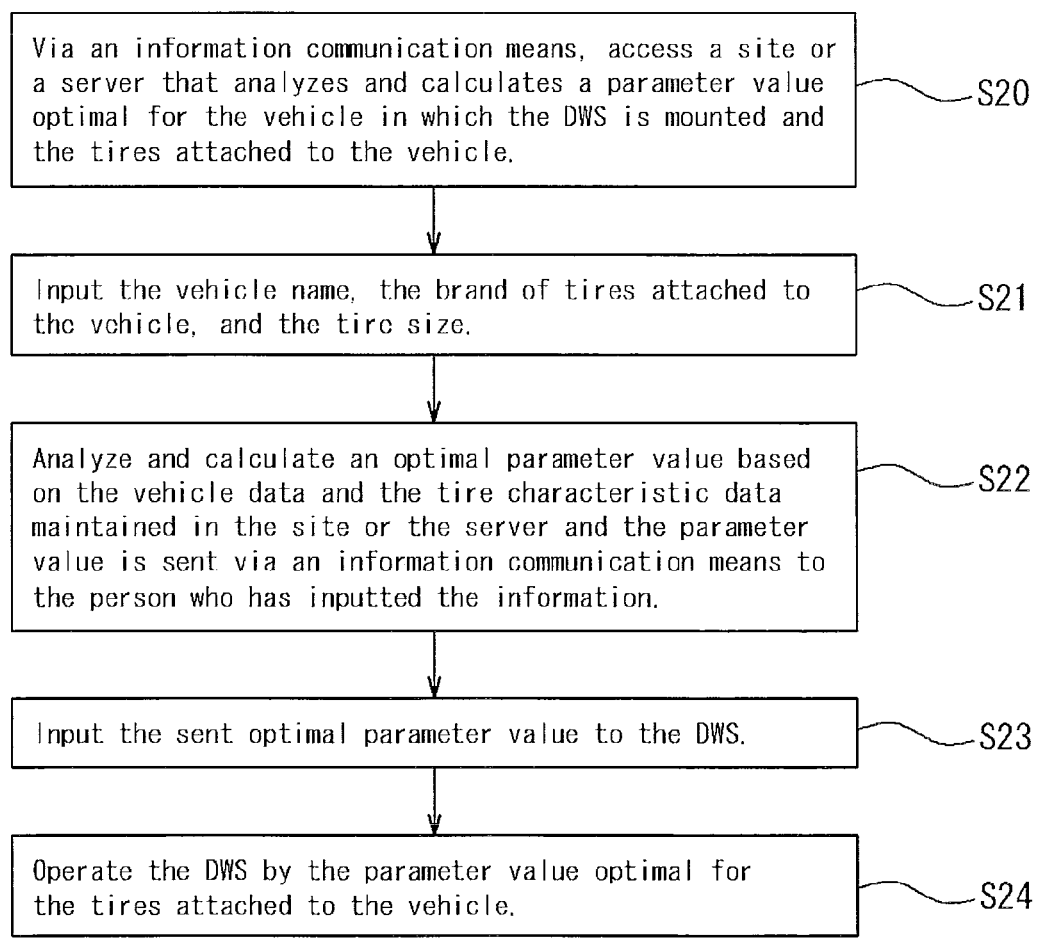
FIG. 11 is a flowchart illustrating another example of the method of setting a parameter in the method of detecting a decreased tire pneumatic pressure.

In this embodiment, the simulation is performed by a site or a server exterior to the vehicle. As shown in FIG. 11, via a means such as an Application Service Provider (ASP) via the Internet, there is accessed a site or a server that can analyze and calculate the parameters required for the DWS to output the result (Step S20). Next, through an input means installed in the in-vehicle computer, information required for the simulation (vehicle name, the brand of the tires attached to the vehicle, the tire size) is inputted (Step S21).

In the site or the server, the vehicle data and the tire characteristic data are maintained. These pieces of data are used to analyze and calculate an optimal parameter value and the resultant parameter value is sent, via an information communication means such as the Internet, to the person who has inputted the information (Step S22).

When the person who has inputted the information inputs the optimal parameter value sent to the person to the DWS mounted in the vehicle (Step S23), then the DWS can be operated at a parameter value optimal to the tires attached to the vehicle (Step S24).

Embodiment C

In this embodiment, the simulation is performed by software installed in a personal computer owned by the manufacturer or an individual person.

Figure 12:
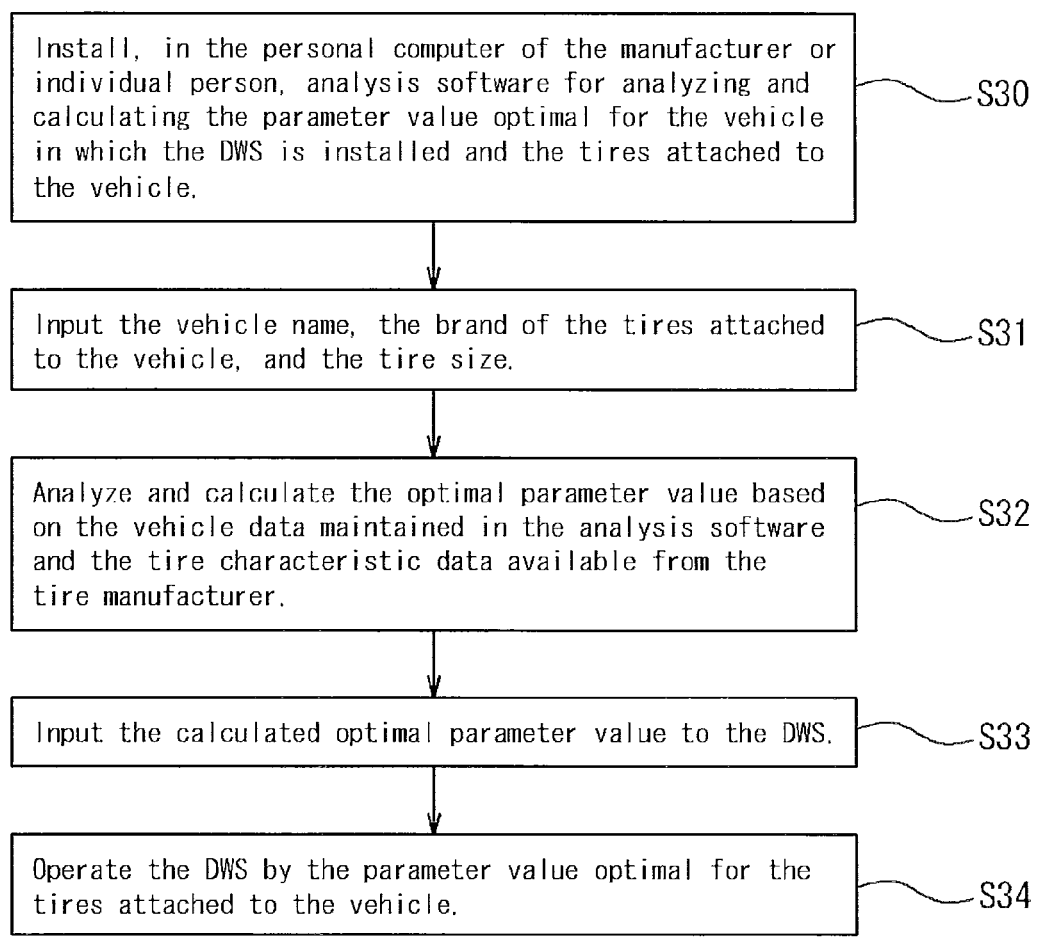
FIG. 12 is a flowchart illustrating still another example of the method of setting a parameter in the method of detecting a decreased tire pneumatic pressure.

First, as shown in FIG. 12, in Step S30, software for analyzing and calculating a parameter value that is optimal for the vehicle in which the DWS is mounted and for the tires attached to this vehicle is installed in the personal computer of the manufacturer or an individual person.

Next, through an input means installed in the in-vehicle computer, information required for the simulation (vehicle name, the brand of the tires attached to the vehicle, the tire size) is inputted (Step S21). Next, based on the vehicle data maintained in the analysis software and the tire characteristic data available from the tire manufacturer, an optimal parameter value is analyzed and calculated by the personal computer of the manufacturer or the individual person (Step S32).

Next, when the optimal parameter value obtained as an output is inputted to the DWS (Step S33), then the DWS can be operated at a parameter value optimal to the tires attached to the vehicle (Step S34).

The vehicle information may include a factor related to the motion performance of the vehicle and thus is very rarely publicized by the vehicle company. Thus, an approach may be considered to input such vehicle information to an in-vehicle computer in advance so that the information cannot be viewed by the third party (Embodiment A) or to allow such information to be acquired only by a manager having a specific confidentiality obligation (a manager of the site or the server (Embodiment B) or the manufacturer or manager of the software (Embodiment C)).

Furthermore, the tire characteristics required as tire information are also not publicized. However, these characteristic values are not information regarding the inner structure or the material blend information unique to the tire manufacturer for example but information that is available by obtaining the tire to measure the tire only.

What is claimed is:

1. A method of setting a parameter in a method of detecting a decreased tire air pressure for detecting a decreased tire air pressure based on a wheel rotational speed obtained from tires attached to a four-wheel driving vehicle, comprising:
   a vehicle model preparation step of preparing a vehicle model including a suspension member;
   a tire model preparation step of preparing a tire model;
   a step of inputting a friction coefficient between a tire and a road surface; and
   a simulation step of performing a running simulation of the vehicle model attached with the tire model,
   wherein a determination parameter for determining whether the tire has a decreased air pressure or not is set based on wheel rotational speeds of the tires of the respective four wheels obtained in the simulation step,
   the wheel rotation speed is obtained in consideration of at least the slip between the tire and a road surface and a change of a tire radius by an application of a load,
   the simulation step further calculates, based on the wheel rotational speed, a parameter for determining the use of different tires for determining that tires having different characteristics are attached to the vehicle, and
   the accuracy of the parameter for determining the use of different tires is checked by simulating the running of the vehicle on a climbing course and the running of the vehicle while pulling a trailer.

2. The method of setting a parameter in a method of detecting a decreased tire air pressure according to claim 1, wherein the tire model is prepared based on tire characteristic values including a front-and-rear force, a lateral force, an aligning moment, and a camber thrust of the tires.

3. The method of setting a parameter in a method of detecting a decreased tire air pressure according to claim 1, wherein the vehicle model is prepared based on vehicle characteristic values including a vehicle gravity center, a vehicle inertia moment, a wheel base length, respective track widths of front and rear wheels of the vehicle, a vehicle weight, a spring characteristic of a suspension, a damper attenuation characteristic, and a roll center height.

4. The method of setting a parameter in a method of detecting a decreased tire air pressure according to claim 3, wherein the tire model is prepared based on tire characteristic values including a front-and-rear force, a lateral force, an aligning moment, and a camber thrust of the tires.

5. A method of setting an alarm threshold in a method of detecting a decreased tire air pressure for detecting a decreased tire air pressure based on a wheel rotational speed obtained from tires attached to a four-wheel driving vehicle, comprising:
   a vehicle model preparation step of preparing a vehicle model including a suspension member;
   a tire model preparation step of preparing a tire model that can at least represent characteristics of a tire front-and-rear force at a normal internal pressure and a decreased pressure;
   a step of inputting a friction coefficient between a tire and a road surface;
   a step of inputting data representing an air resistance generated in the vehicle when the vehicle is running, the data including a vehicle frontal projected area, a reference point upon which an aerodynamic force acts, an air drag coefficient, and an air lift force coefficient; and
   a simulation step of performing a running simulation of the vehicle model attached with the tire model,
   wherein the simulation step is performed by a site or a server exterior to the four-wheel driving vehicle,
   the vehicle model and the tire model are prepared with the use of the vehicle data and the tire characteristic data that are selected based on information including vehicle name, the brand of the tires attached to the vehicle and the tire size inputted through an input means installed in an in-vehicle computer of the four-wheel driving vehicle, and
   an alarm threshold for determining whether a driving wheel tire has a decreased air pressure or not is set at a site of the server, based on the wheel rotational speeds of the tires of the respective four wheels obtained in the simulation step.

6. The method of setting a parameter in a method of detecting a decreased tire air pressure according to claim 5, wherein the vehicle model is prepared based on vehicle characteristic values including a vehicle gravity center, a vehicle inertia moment, a wheel base length, respective track widths of front and rear wheels of the vehicle, a vehicle weight, a spring characteristic of a suspension, a damper attenuation characteristic, and a roll center height.

* * * * *